United States Patent [19]

Ota et al.

[11] Patent Number: 5,146,446
[45] Date of Patent: Sep. 8, 1992

[54] DISC PLAYER HAVING AUTOMATIC DISC EJECTION, AND METHOD OF PROVIDING SAME

[75] Inventors: Miho Ota; Naoki Masaki, both of Saitama, Japan

[73] Assignee: Pioneer Electronic Corporation, Tokyo, Japan

[21] Appl. No.: 865,668

[22] Filed: Apr. 8, 1992

Related U.S. Application Data

[63] Continuation of Ser. No. 340,821, Apr. 20, 1989, abandoned.

[30] Foreign Application Priority Data

Oct. 29, 1988 [JP] Japan .................. 63-274116

[51] Int. Cl.$^5$ ............................................ G11B 33/02
[52] U.S. Cl. ............................ 369/77.2; 369/75.2; 369/77.1; 369/178; 369/191; 369/196; 360/98.05
[58] Field of Search ............ 369/75.1, 75.2, 77.1, 369/77.2, 176, 178, 179, 180, 191, 192, 193, 194, 196, 201, 202, 215, 233, 235; 360/98.01, 98.04–98.06, 99.02

[56] References Cited

U.S. PATENT DOCUMENTS

| | | | |
|---|---|---|---|
| 3,008,721 | 11/1961 | Corbett, Jr. et al. | 369/191 X |
| 4,195,321 | 3/1980 | Chelin et al. | 369/191 X |
| 4,433,406 | 2/1984 | Saito et al. | 369/77.2 |
| 4,455,637 | 6/1984 | Suzuki et al. | 369/77.1 |
| 4,481,617 | 11/1984 | Mabry | 369/77.2 |
| 4,492,996 | 1/1985 | Saito | 369/77.2 |
| 4,614,474 | 9/1986 | Sudo | 369/192 X |
| 4,733,314 | 3/1988 | Ogawa et al. | 369/77.2 X |
| 4,752,920 | 6/1988 | d'Alayer de Costemore d'Arc | 369/33 |
| 4,899,326 | 2/1990 | Takeya et al. | 369/36 |
| 4,912,575 | 3/1990 | Shiosaki | 369/191 |
| 4,949,328 | 8/1990 | Kase et al. | 369/75.2 |

Primary Examiner—William M. Shoop, Jr.
Assistant Examiner—David Martin
Attorney, Agent, or Firm—Sughrue, Mion, Zinn, Macpeak & Seas

[57] ABSTRACT

A front loading disc player including two trays that can carry respective discs and having a selectable automatic disc ejection feature. When the automatic ejection mode is selected and scheduled play is completed, there is an interchanging of a playing operation from a first disc to a second disc and automatically ejecting of the first disc from a player housing. An interchanging of a playing operation from the first disc to the second disc and automatically ejecting the first disc from the player housing, are not conducted until a program of all selected tunes on the first disc is completed playing.

13 Claims, 4 Drawing Sheets

DISC PLAYER HAVING AUTOMATIC DISC EJECTION, AND METHOD OF PROVIDING SAME

This is a continuation of application Ser. No. 07/340,821 filed Apr. 20, 1989 now abandoned.

BACKGROUND OF THE INVENTION

The present invention relates to a front loading disc player.

Recently, there has been proposed a front loading disc player, such as the one disclosed in Japanese Patent Application No. 51192/88, which includes two trays that can carry respective discs, and is capable of playing the two discs continuously for long term uninterrupted play. In this front loading disc player, it is possible to eject one of the trays and exchange the disc placed on the tray with a new disc at the same time a disc maintained on a turntable by the other tray is being played. Therefore, by alternately repeating such an exchange operation between the trays, it becomes possible to carry out a continuous playing of a large number of discs without interruption.

In such a front loading disc player, disc ejection is executed through operation of an ejection switch by the operator. However, the above-described embodiment is disadvantageous in that, there can occur a case in which the operator cannot tell which one of the two discs housed in the player housing has completed playing. This may lead to a wasteful operation, i.e., an interruption in playing due to an ejecting of a playing disc which should not have been ejected.

SUMMARY OF THE INVENTION

It is, therefore, an object of the present invention to provide a front loading disc player for housing and selectively playing a plurality of discs, said player allowing a more accurate ejection operation of the disc.

The front loading disc player in accordance with the present invention is a front loading disc player which plays a plurality of discs that are supplied in the vicinity of disc insertion openings provided in the player housing, and are drawn into waiting positions within the player housing, said player characterized in that it is given a construction in which a disc, among those placed in the waiting positions and whose scheduled playing has been completed, is ejected by the transfer means in response to a play completion signal issued by the playing means, in order to prevent the operator from executing a wasteful ejection operation of a disc.

DETAILED DISCUSSION OF THE PREFERRED EMBODIMENT

Referring to the accompanying drawings, a front loading disc player of the present invention will now be described.

Figure 1:
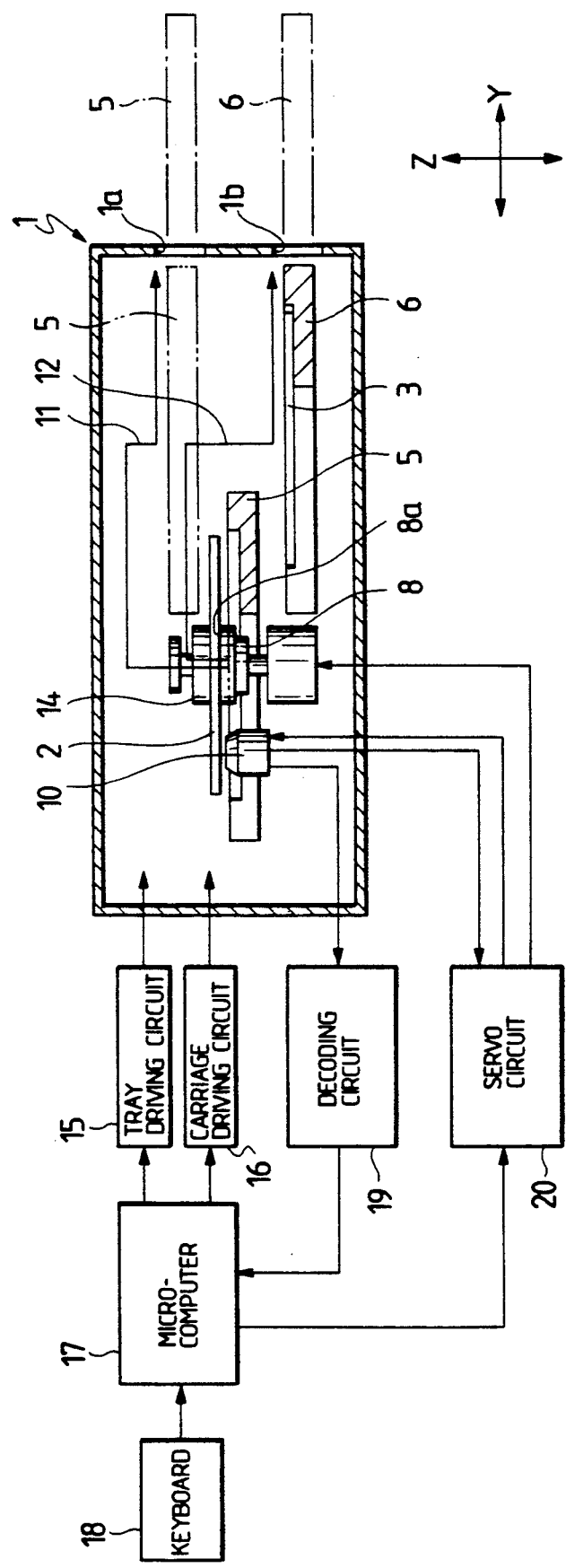
FIG. 1 is a diagram which is a combination of a longitudinal sectional diagram of a mechanism part of the front loading disc player, and a block diagram of the control system of a preferred embodiment of the present invention.

As shown in FIG. 1, in a front part of the player housing 1, there are provided disc insertion openings 1a and 1b to permit rectangular, plate-like upper tray 5 and lower tray 6 (carrying respective discs 2 and 3 which are to be played) to stick out of the player housing. The discs 2 and 3 may typically be digital audio discs each having a diameter of about 12 cm or about 8 cm. The upper and lower trays 5 and 6, with circular recessed parts (not shown) for fittingly receiving the discs 2 and 3, respectively, are provided in parallel in a direction perpendicular to a carrying surface 8a of a turntable 8, i.e., the upper and lower trays 5 and 6 are substantially parallel but displaced from one another in a vertical direction (with a vertical direction, for the purpose of discussions of the present specification, being indicated by the arrow Z in FIG. 1). The upper tray 5 and the lower tray 6 are formed in approximately the same shape.

Proximate to the rear of the turntable 8, there is provided a carriage 10 that carries an optical pickup freely movable in the front and rear directions (indicated by the arrow Y) so as to be freely movable along a recording surface of a disc 2 placed on the turntable 8. Further, there is provided carriage driving means (not shown) for driving the carriage 10. The optical pickup, carriage 10 and carriage driving means constitute, together with the turntable 8, disc playing means.

Also in the player housing 1 there is provided a tray guiding mechanism (not shown), with the upper tray 5 and the lower tray 6 being guided along crank-like guiding paths 11 and 12, respectively, by means of the guiding mechanism.

In FIG. 1, position of the upper tray 5 shown by the solid line is in a position disposed upon the turntable 8 for serving the carried disc 2 for playing, such a disposition upon the turntable 8 being called the playing position. In addition, an alternative position of the upper tray 5 (indicated by the two-dot chain line) is referred to as a waiting position, said upper tray 5 in a waiting position (in a preferred embodiment) being housed completely in the player housing 1. The upper tray 5 can also be moved to a disc loading/unloading position outside of the player housing (indicated by a one-dot chain line), by being guided horizontally from the waiting position. The loading/unloading of a disc to/from the tray takes place at this loading/unloading position.

On the other hand, as for the tray 6, the position indicated by the solid line is a waiting position, and the position shown by the one-dot chain line is its loading-/unloading position. The playing position for the lower tray 6 is arranged to be coincident with that of the tray 5, which means that the playing position for the tray 5 shown by the solid line is also the playing position for the lower tray 6.

As is clear from FIG. 1, the upper tray 5 and the lower tray 6 carry out respective ascent, horizontal movement and descent operations when they move between the playing position and the waiting position. This interchange of the playing means for both trays (i.e., an interchange or removal of the upper tray 5 and replacement of the lower tray 6, or vice versa) into a playing position takes place during the above-mentioned set of operations.

The upper tray 5 and the lower tray 6 are moved along the guiding paths 11 and 12 by means of tray driving means (not shown). A combination of the tray guiding mechanisms for the upper tray 5 and the lower tray 6 and the tray driving means are generally referred to as a tray positioning means. In other words, the upper tray 5 and the lower tray 6 are appropriately positioned by the tray positioning means, to the playing position, waiting position or disc loading/unloading position. Further, the positioning means, upper tray, and lower tray constitute a mechanism part of the transfer mechanism which has the ability to draw a plurality of discs 2 and 3 provided at the disc insertion openings 1a and 1b of the player housing 1 into the waiting positions.

Moreover, as shown in FIG. 1, the disc 2 placed on the turntable 8 is clamped to the turntable 8 by means of a clamping mechanism which includes a disc-like disc pressing member 14. The clamp mechanism is included in the playing means.

The operation of the positioning means, which carries out the positioning of the upper tray 5 and the lower tray 6, is controlled by a microcomputer via a tray driving circuit 15 and a carriage driving circuit 16 shown in FIG. 1. The microcomputer 17 controls the operation of not only the disc transfer means (including the positioning means) in response to a command supplied via a keyboard 18, but also the playing means (including the turntable 8 and the optical pickup) via a decoding circuit 19 and a servo circuit 20. A read signal output from the optical pickup (hereinafter referred to as a reproduced RF signal) is supplied to the decoding circuit 19 which is an EFM (Eight to Fourteen Modulation) demodulation circuit. The decoding circuit 19 obtains digital data including PCM data on a sub-code including controlling information by subjecting pulse signals (obtained by slicing the reproduced RF signal) to EFM demodulation processing. The sub-code includes so-called TOC (Table of Contents) information and is supplied to the microcomputer 17. The microcomputer 17 stores the TOC information, and carries out operations to determine various operational states of the player, e.g., position discrimination of each of the discs 2 and 3, designated tune, and the like.

Further, the servo circuit 20 provided in conjunction with the optical pickup issues a driving signal to servo driving means consisting of a focus servo (not shown) and a tracking servo (not shown), and issues a driving signal for a spindle servo (not shown) to a spindle motor to drive the turntable 8.

The microcomputer 17 has a predetermined stored subroutine program, and issues commands to the mechanism part in accordance with the program to carry out control of various kinds of operations such as the playing, disc loading and ejection operations.

When a play command is supplied to the microcomputer via a keyboard 18, a play start subroutine is executed. In the play start subroutine, play is started after confirmation of a disc clamp, confirmation of whether a tune selection operation, is an ordinary play, a programmed play, a random play or the like, and operation of the servo system such as the spindle servo, focus servo, tracking servo and the like. As particulars of a play start subroutine are well known in the art, no further description will be given.

Figure 2:
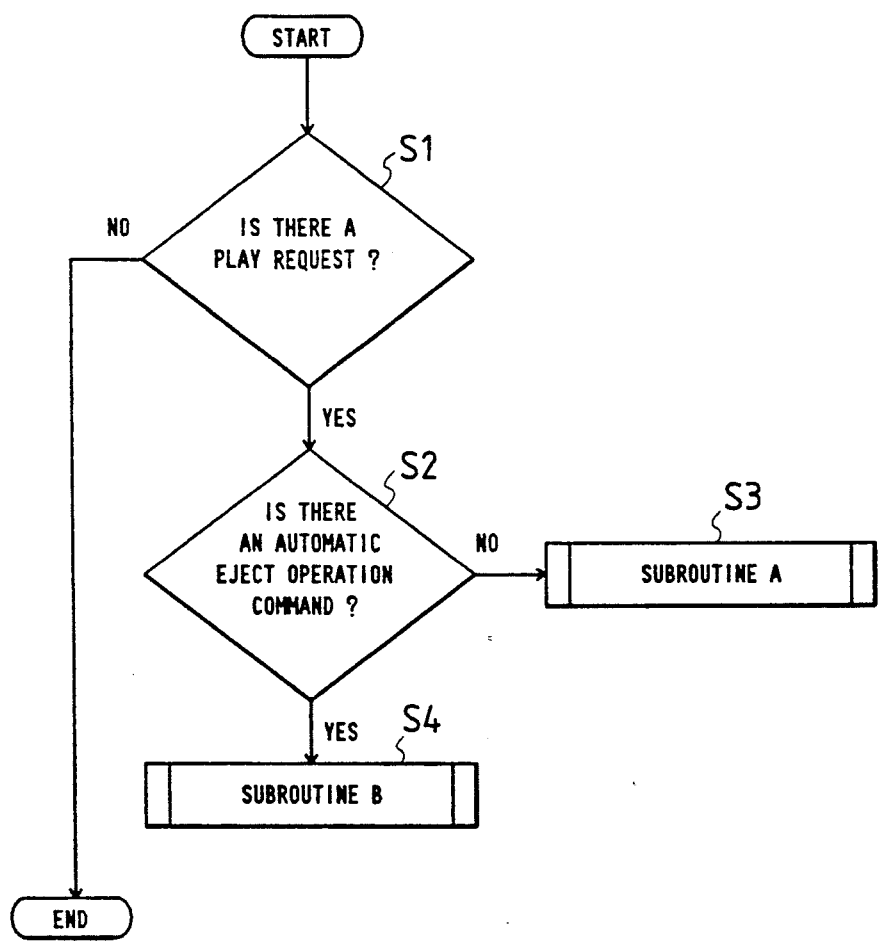
FIG. 2 through FIG. 4 are flow charts for explaining the operation of the front loading disc player of the present invention.
Figure 3:
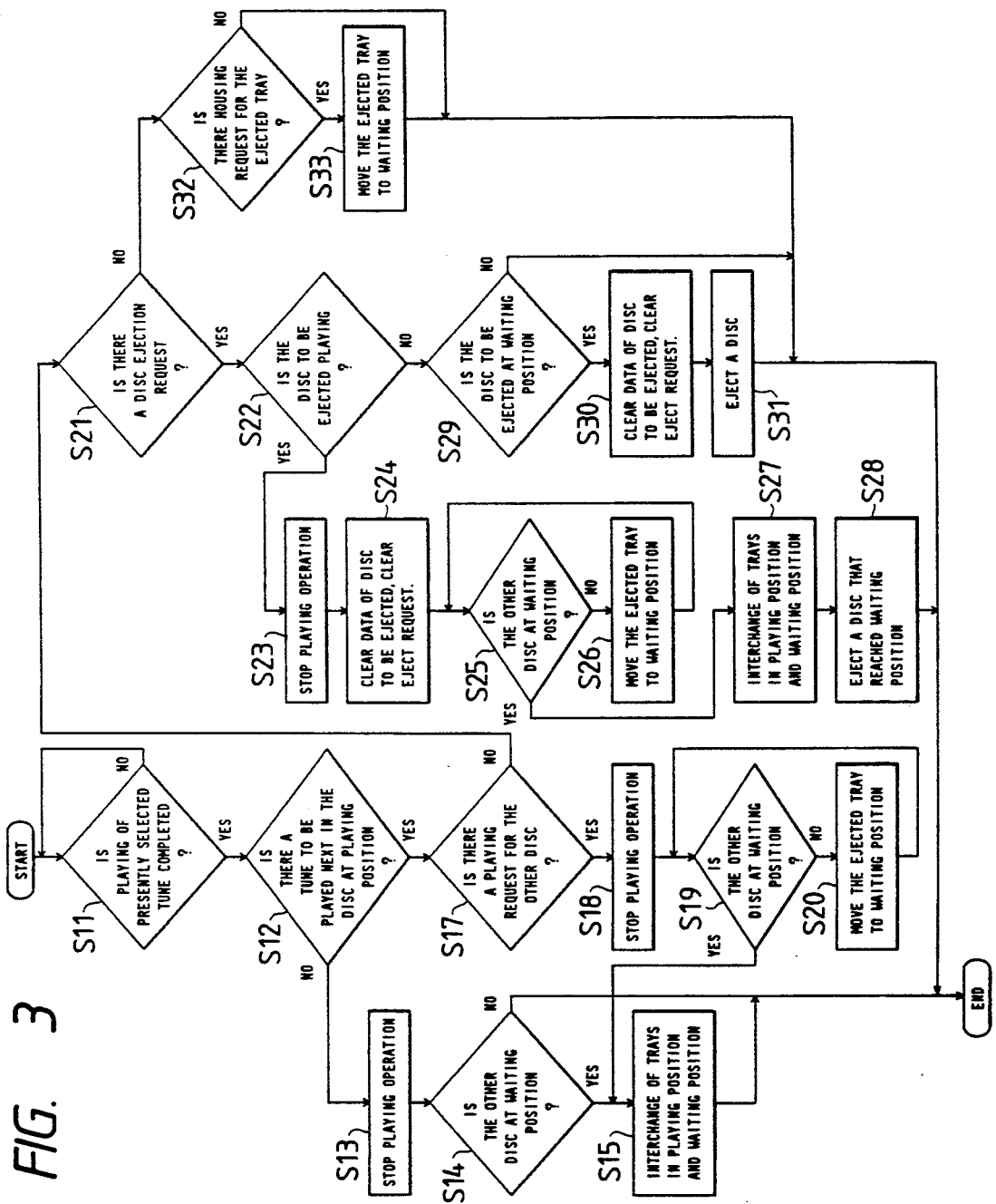
Figure 4:
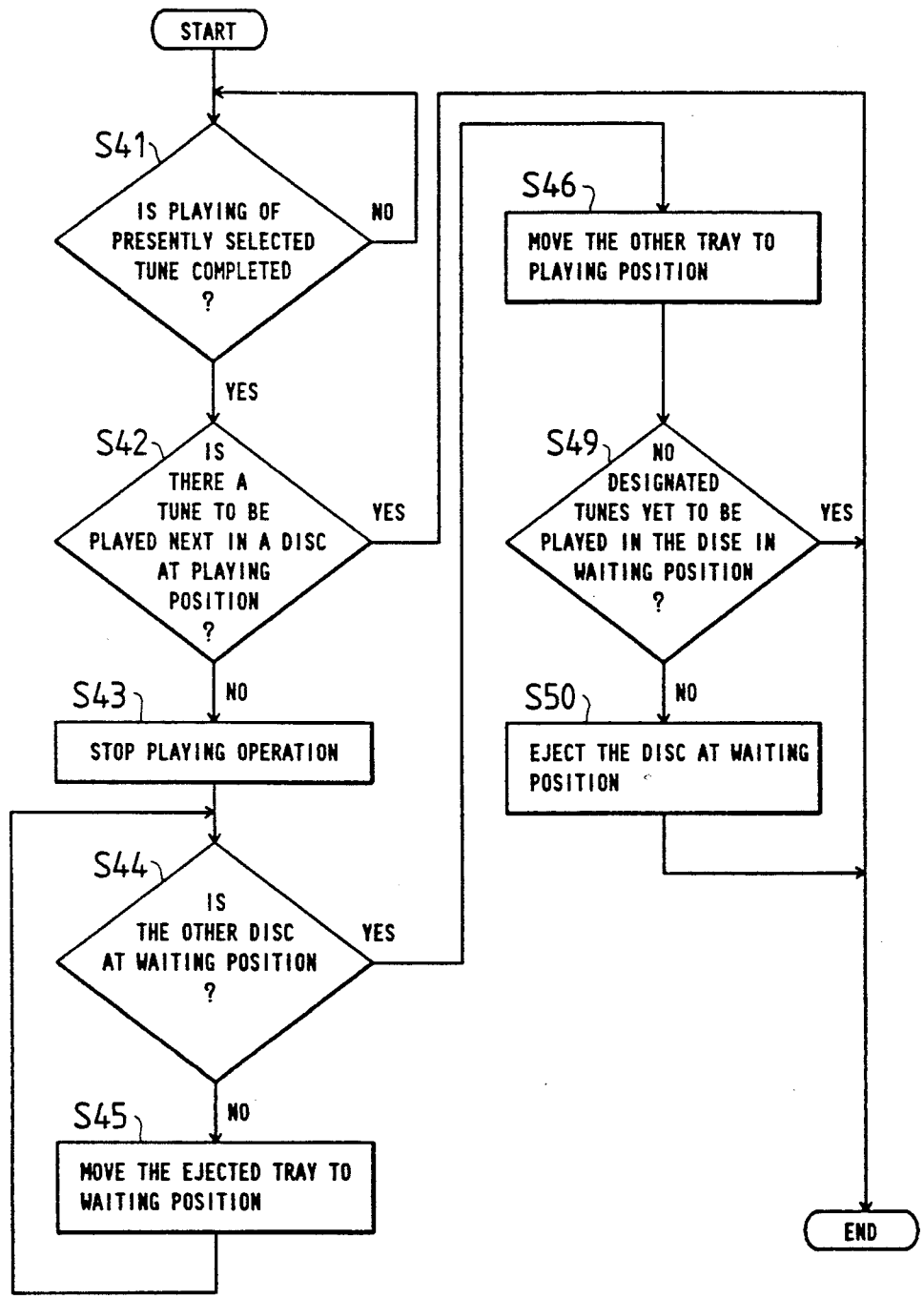

A subroutine covering a processing operation which is conducted after completion of a play start operation is shown in FIG. 2 through FIG. 4.

In FIG. 2, it is first judged whether or not there is a presence or absence of a play request (step S1). When a play request is detected in a step S1, then it is judged (step S2) whether or not there exists an automatic eject command. When there is no such command, the operation is controlled (step S3) in accordance with a subroutine A (described below) and when there is such a command, the operation is controlled (step S4) in accordance with a subroutine B (described below).

FIG. 3 shows a flow chart program of a subroutine A. In a step S11, it is determined whether the playing of the presently selected tune (tune under current selection) is completed. When the playing of a presently selected tune has been completed, a next step S12 is used to determine whether the next tune to be played is located on the disc at the playing position, and when there is not, a playing operation is stopped (step S13). It should be noted that the phrase "a playing operation is stopped" includes such operations as stopping rotation of the spindle, sending the pickup to its home position, and the like.

As one example of performance of the step S12, the presence or absence of a designated tune to be played can be determined by the presence or absence of information (corresponding to a selected designated tune) in a predetermined address of a RAM within the microcomputer 17.

The next step S14 is used to determine whether the other disc 3 is in its waiting position. When the disc 3 is in the waiting position, a series of operations are performed with the disc 2 being returned to its waiting position by the upper tray 5, the lower tray carrying the disc 3 is moved to the playing position, and the discs 2 and 3 are interchanged (step S15).

By the operation up to this point, the upper tray 5 is returned to the waiting position and the lower tray 6 is brought to the playing position. Thereafter, by pressing an eject button for ejecting the upper tray 5, the upper tray is moved to a position to stick out of the player housing 1 in the disc loading/unloading position. The disc on the tray can be interchanged with a new disc. During this time, the lower tray 6 is kept stationary so that the playing of the disc 3 (which has been transferred onto the turntable 8 by the lower tray) can be continued without interruption.

On the other hand, when in step S12 there is a selected designated tune which is to be played next from the disc 2 already at the playing position, a next step S17 is used to determine whether the playing of the other disc 3 has been requested. When there is a request for playing the other disc 3, the playing operation of the disc 2 is stopped (step S18), and subsequently, a step S19 is used to determine whether the other disc 3 is in a waiting position. When the disc 3 is in the waiting position, the disc 2 and 3 are interchanged (step S15). When the disc 3 is not in the waiting position, the lower tray 6 carrying the disc is drawn into a waiting position from the disc loading/unloading position (step S20), and then the discs 2 and 3 are interchanged.

When in step S17 it has been determined that there is no request for a playing of the other disc 3, a next step S21 is used to determine whether there has been a request to eject the disc. When there is an eject request, a step S22 is used to determine whether the disc to be ejected is mounted on the spindle ready for a playing condition. When the disc to be ejected is in a playing position, the playing operation of the disc 2 is stopped (step S23), and subsequently the stored data and the eject request for the disc are erased (step S24). Then, a step S25 is used to determine whether the other disc 3 is in the waiting position, and when the disc 3 is not in the waiting position, the lower tray 6 carrying the disc 3 is drawn into the waiting position from the disc loading- /unloading position (step S26). Further, when the disc 3 is in the waiting position, the lower tray 6 in the waiting position and the upper tray 5 in the playing position are interchanged (step S27). Then, the disc 2 which has been returned to the waiting position is ejected (step S28).

On the other hand, when in step S22 it is judged that the disc to be ejected is not the one being played, a step S29 is used to determine whether the disc to be ejected is in the waiting position, and when it is in the waiting position, the data stored about the disc 3 and the eject request are erased (step S30), and the disc is ejected (step S31).

When in step 21 it is judged that there is no eject request, a step S32 is used to determine whether there is a request for housing the ejected tray, and when there is a housing request, the tray is retracted to be housed in the waiting position (step S33).

FIG. 4 shows the subroutine B mentioned earlier. In subroutine B, a step S41 is used to determine whether there has been a playing or completion of the presently selected tune. Upon completion, a step S42 is used to determine whether there is a presence or absence of a next designated tune as to the disc in the playing position. When it is judged that there are no more selected designated tunes with respect to the disc, and the scheduled playing is all completed, the playing operation is stopped (step S43). Next, a step S44 is used to determined whether the other disc 3 is in a waiting position, and when the disc 3 is not in the waiting position, the lower tray 6 which carries the disc is drawn into the waiting position from the loading/unloading position (step S45). When in step S44 the disc 3 is in the waiting position, the disc 2 for which the scheduled playing has been completed, is returned to the waiting position carried by the upper tray 5. At the same time, the disc 3 is moved to the playing position by the lower tray 6, i.e., the discs 2 and 3 are interchanged (step S46) as to playing position. Then, a step S49 is used to determine whether there remain any designated tunes that have not yet been played with respect to the disc 2 which is located at the waiting position, and when there remains none, the disc is ejected (step S50).

As in the above, the player is given a construction in which a disc that has completed the scheduled playing is ejected automatically. Therefore, the operator is required neither to judge which disc has completed the scheduled playing, nor to press the eject button in order to interchange the discs.

Moreover, in the present embodiment, the number of trays that carry and transfer the disc has been described as being set to two, but it is possible to use three or more of the trays. In addition, the upper tray 5 and the lower tray 6 are arranged to be moved between the waiting position and the playing position within the player housing 1. It is also possible to construct an embodiment wherein each tray is able to take on only a waiting position and is not able to be moved to a playing position, i.e., an embodiment wherein the playing means is instead moved between the trays.

Furthermore, in the present embodiment, a front loading disc player of the tray projection type in which each tray is moved to project out of the player housing is illustrated. However, the present invention is also applicable to a front loading disc player of the so-called slot-in type in which the trays do not project out of the player housing, but instead there are formed, oblong dish insertion openings in the player housing, through which discs alone can be inserted.

As described in detail in the foregoing, there is provided a front loading disc player which is able to monitor a plurality of discs that are brought into a waiting position within the player housing by transfer means, and as a result of this monitoring, those discs of which scheduled playing has already been complete are ejected by the transfer means.

Accordingly, there is no need for an operator to judge which disc has completed a scheduled playing and is ready to be ejected for interchange with another new disc. The operator is simply required to interchange a disc that is ejected so that the operability is improved especially in the case of random playing and the like.

What is claimed is:

1. A disc player with automatic disc ejection, said player having a disc playing position for individually playing each of a plurality of discs, a plurality of loading/unloading positions outside a player housing to provide separate removal of each of said plurality of discs by a user, and an equal plurality of waiting positions for holding the plurality of disc inside said player housing between said loading/unloading and playing positions, said player comprising:

means for moving each of said plurality of discs between said loading/unloading, waiting and playing positions;

means for playing a selected disc from among said plurality of discs;

means for determining whether an automatic ejection mode is selected;

means for determining, during times when said automatic ejection mode is selected, whether a scheduled play of a first disc positioned at the playing position is completed; and means for automatically ejecting, at a time when said automatic ejection mode is selected and said scheduled play is completed, said first disc from said player housing, wherein a second disc is played while said first disc is ejected to one of said loading/unloading positions for removal by a user, said automatic ejection means preventing an erroneous ejection of said first disc.

2. A disc player as claimed in claim 1, wherein said automatic ejection means comprises:

means for managing a position of said second disc such that said second disc is positioned within said player housing at a waiting position suitable for interchanging a playing operation from said first disc to said second disc;

means for changing a reading relationship of said means for selectively playing, from a reading relationship with respect to said first disc, to a reading relationship with respect to said second disc; and means for automatically ejecting said first disc from said player housing.

3. A disc player as claimed in claim 2, wherein said means for managing a position of said second disc comprises:

means for moving said second disc from a loading/unloading position to said waiting position if said second disc is not currently positioned within said player housing at said waiting position.

4. A disc player as claimed in claim 3, wherein said means for changing a reading relationship of said means for selectively playing, comprises:

means for removing said first disc from a mounted position on a turntable of said means for selectively playing; and means for mounting said second disc onto said mounted position on said turntable of said means for selectively playing.

5. A disc player as claimed in claim 4, wherein said means for determining whether a scheduled play of a first disc is completed comprises:

means for determining whether a presently selected tune on said first disc is completed playing; and means for determining, after a presently selected tune on said first disc is completed playing, whether a program of all selected tunes on said first disc is completed playing.

6. A disc player as claimed in claim 5, wherein an interchanging of a playing operation from said first disc to said second disc and said automatic ejection of said first disc from said player housing, are not conducted until a program of all selected tunes on said first disc is completed playing.

7. A method of providing automatic disc ejection in a disc player having a disc playing position, a plurality of loading/unloading positions outside a player housing to provide separate removal of each of a plurality of discs by a user, and a plurality of waiting positions for storing the plurality of discs inside said player housing between said loading/unloading and playing positions, wherein said disc player comprises means for maintaining a plurality of discs at said waiting positions within a player housing and means for playing a selected disc within said plurality of discs, said method comprising the steps of:

determining whether an automatic ejection mode is selected;

determining, during times when said automatic ejection mode is selected, whether a scheduled play of a first disc is completed; and automatically ejecting, at a time when said automatic ejection mode is selected and said scheduled play is completed, said first disc from said player housing to said loading/unloading position for removal by a user, while a second disc is played, said automatic ejection step preventing an erroneous ejection of said first disc.

8. A method as claimed in claim 7, wherein said automatic ejection step comprises sub-steps of:

managing a position of said second disc such that said second disc is positioned within said player housing at a waiting position suitable for interchanging a playing operation from said first disc to said second disc;

changing a reading relationship of said means for selectively playing, from a reading relationship with respect to said first disc, to a reading relationship with respect to said second disc; and automatically ejecting said first disc from said player housing.

9. A method as claimed in claim 8, wherein said step of managing a position of said second disc includes a step of:

moving said second disc from a loading/unloading position to said waiting position if said second disc is not currently positioned within said player housing at said waiting position.

10. A method as claimed in claim 9, wherein said step of changing a reading relationship of said means for selectively playing, includes sub-steps of:

removing said first disc from a mounted position on a turntable of said means for selectively playing; and mounting said second disc onto said mounted position on said turntable of said means for selectively playing.

11. A method as claimed in claim 10, wherein said step of determining whether a scheduled play of a first disc is completed comprises the sub-steps of:

determining whether a presently selected tune on said first disc is completed playing; and determining, after a presently selected tune on said first disc is completed playing, whether a program of all selected tunes on said first disc is completed playing.

12. A method as claimed in claim 11, wherein said automatic ejection step and a step for interchanging a playing operation from said first disc to said second disc, are not conducted until a program of all selected tunes on said first disc is completed playing.

13. A front loading disc player comprising a player housing having disc insertion openings, transfer means for individually and separately moving a plurality of discs between corresponding loading/unloading positions outside the player housing and waiting positions within said player housing, said front loading disc player comprising:

playing means for selectively playing a first selected disc within said plurality of discs, and for issuing a play completion signal for said first selected disc whose scheduled play is completed; and means for automatically ejecting said first selected disc, whose scheduled play is completed, through one of said disc insertion openings to a corresponding loading/unloading position for removal by a user based on said play completion signal, while moving a second selected disc to said playing position, said automatic ejection step preventing an erroneous ejection of said first disk.

* * * * *